(12) United States Patent
Cherubini et al.

(10) Patent No.: US 11,823,038 B2
(45) Date of Patent: Nov. 21, 2023

(54) MANAGING DATASETS OF A COGNITIVE STORAGE SYSTEM WITH A SPIKING NEURAL NETWORK

(71) Applicant: International Business Machines Corporation, Armonk, NY (US)

(72) Inventors: Giovanni Cherubini, Rueschlikon (CH); Timoleon Moraitis, Glattpark (CH); Abu Sebastian, Adliswil (CH); Vinodh Venkatesan, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 1399 days.

(21) Appl. No.: 16/015,897

(22) Filed: Jun. 22, 2018

(65) Prior Publication Data
US 2019/0392303 A1    Dec. 26, 2019

(51) Int. Cl.
*G06N 3/08*    (2023.01)
*G06N 3/049*   (2023.01)

(52) U.S. Cl.
CPC .............. *G06N 3/08* (2013.01); *G06N 3/049* (2013.01)

(58) Field of Classification Search
CPC ...... G06N 3/084; G06N 20/00; G06N 3/0445; G06N 3/0454; G06N 3/02; G06N 3/006;
(Continued)

(56) References Cited

U.S. PATENT DOCUMENTS 7,725,463 B2   5/2010  Hurst-Hiller et al.
8,589,398 B2   11/2013 Sundaresan et al.
(Continued)

FOREIGN PATENT DOCUMENTS

CN   103729428 A   4/2014
CN   106650799 A   5/2017
(Continued)

OTHER PUBLICATIONS

Lopez, Vivian et al., A Model for Multi-Label Classification and Ranking of Learning Objects, 2012, Expert Systems with Applications 39 pp. 8878-8884 (Year: 2012).*

Wade, John et al., Swat: A Spiking Neural Network Training Algorithm for Classification Problems, 2010, IEEE Transactions on Neural Networks, vol. 21, No. 11, Nov. 2010, pp. 1817-1830 (Year: 2010).*

(Continued)

*Primary Examiner* — Ann J Lo
*Assistant Examiner* — Charles C Kuo
(74) *Attorney, Agent, or Firm* — Joseph C. Drish; Harrington & Smith

(57) ABSTRACT

A computer-implemented method for managing datasets of a storage system is provided, wherein the datasets have respective sets of metadata, the method including: successively feeding first sets of metadata to a spiking neural network (SNN), the first sets of metadata fed corresponding to datasets of the storage system that are labeled with respect to classes they belong to, so as to be associated with class labels, for the SNN to learn representations of said classes in terms of connection weights that weight the metadata fed; successively feeding second sets of metadata to the SNN, the second sets of metadata corresponding to unlabeled datasets of the storage system, for the SNN to infer class labels for the unlabeled datasets, based on the second sets of metadata fed and the representations learned; and managing datasets in the storage system, based on class labels of the datasets, these including the inferred class labels.

20 Claims, 5 Drawing Sheets

(58) Field of Classification Search
CPC ...... G06N 3/0472; G06N 3/126; G06N 7/005;
G06N 3/088; G06N 5/046; G06N 3/08;
G06N 3/049; G06N 3/0436; G06N 20/20;
G06N 3/063; G06N 5/003; G06N 20/10;
G06N 3/0427; G06N 3/086; G06N
3/0481; G06N 3/04; G06N 5/02; G06N
5/025; G06N 5/027; G06N 3/00; G06N
3/008; G06N 3/0409; G06N 3/061; G06N
3/105; G06N 5/041; G06N 7/023; G06N
99/00
See application file for complete search history.

(56) References Cited

U.S. PATENT DOCUMENTS

| | | | |
|---|---|---|---|
| 8,756,183 | B1 | 6/2014 | Dailey et al. |
| 2002/0165860 | A1 | 11/2002 | Glover et al. |
| 2014/0201126 | A1* | 7/2014 | Zadeh .................. A61B 5/165 706/52 |
| 2017/0286828 | A1 | 10/2017 | Smith |
| 2018/0174026 | A1* | 6/2018 | Davies .................. G06N 3/063 |

FOREIGN PATENT DOCUMENTS

| | | |
|---|---|---|
| CN | 107274425 A | 10/2017 |
| CN | 107430704 A | 12/2017 |
| CN | 107636693 A | 1/2018 |
| CN | 1077295555 A | 2/2018 |
| WO | 2015/030606 A2 | 3/2015 |

OTHER PUBLICATIONS

Li, Mu et al., Scaling Distributed Machine Learning with the Parameter Server, 2014, 11th USENIX Symposium on Operating Systems Design and Implementation, pp. 583-598 (Year: 2014).*

Lee, Jun et al., Training Deep Spiking Neural Networks Using Backpropagation, 2016 (Year: 2016).*

Panda et al., Convolutional Spike Timing Dependent Plasticity based Feature Learning in Spiking Neural Networks, 2017 (Year: 2017).*

Tur, Gokhan et al., Combining Active and Semi-Supervised Learning for Spoken Language Understanding, 2005 (Year: 2005).*

Xing et al., An Adaptive Fuzzy C-Means Clustering-Based Mixtures of Experts Model for Unlabeled Data Classification, 2008, Neurocomputing 71, pp. 1008-1021 (Year: 2008).*

Jing Peng and Bir Bhanu "Feature Relevance Estimation for Image Databases" Center for Research in Intelligent Systems, University of California, Riverside, CA 92521. https://www.researchgate.net/profile/Jing_Peng2/publication/2908046_Feature_Relevance_Estimation_for_Image_Databases/links/547ca62c0cf27ed978622b35/Feature-Relevance-Estimation-for-Image-Databases.pdf [retrieved Jun. 18, 2018].

Gianluca Bontempi and Patrick E. Meyet "A Model-Based Relevance Estimation Approach for Feature Selection in Microarray Datasets" Machine Learning Group, Computer Science Department. https://dl.acm.org/citation.cfm?id=1429413 [retrieved Jun. 18, 2018].

Paul A. Merolla et al. "A Million Spiking-Neuron Integrated Circuit with a Scalable Communication Network and Interface" Sciencemag.org vol. 345 Issue 6197, Aug. 8, 2014. http://science.sciencemag.org/ [downloaded on Jun. 21, 2018].

Emre Neftci et al. "Synthesizing Cognition in Neuromorphic Electronic Systems" www.pnas.org/cgi/doi/10.1073/pnas.1212083110 [Published online Jul. 22, 2013].

C. Koch and S.Ullman "Shifts in Selective Visual Attention: Towards the Underlying Neural Circuitry" Human Neurobiology 1985 pp. 219-227.

Peter U. Diehl and Matthew Cook "Unsupervised Learning of Digit Recognition Using Spike-Timing-Dependent Plasticity" Frontiers in Computer Neuroscience vol. 9 Article 99 published Aug. 3, 2015. doi 10.3389/fncom.2015.00099.

"List of IBM Patents or Applications Treated as Related"; Jun. 2018. 2 pgs.

* cited by examiner

MANAGING DATASETS OF A COGNITIVE STORAGE SYSTEM WITH A SPIKING NEURAL NETWORK

BACKGROUND

Example embodiments described herein relate in general to the field of computer-implemented methods and systems for managing datasets of a storage system, and more particularly to cognitive storage systems that rely on spiking neural network to learn and infer representations of classes the datasets belong to, to accordingly manage the datasets across the storage system.

In a cognitive storage system, the relevance of the files is sometimes used to determine storage policies of the system, in order to reduce storage costs while retaining reliability and performance for the management of the files. The relevance (or value) of data is a metric associated with datasets (e.g., files) that reflects the importance of such datasets to a user, or users. The relevance of a file can for instance be estimated by obtaining samples of important and unimportant files from the user and applying a supervised learning algorithm to estimate the relevance metric for other files.

Besides, multi-tiered storage systems are known, which comprise several tiers of storage. Such systems typically assign different categories of data to various types of storage media, in order to reduce the global storage cost, while maintaining performance. A tiered storage system usually relies on policies that assign most frequently accessed data to high-performance storage tiers, whereas rarely accessed data are stored on low-performance (cheaper, and/or slower) storage tiers.

Consider for example a storage system wherein applications are run on large batches of datasets (e.g., astronomical data repositories, financial transaction logs, medical data repositories). Data that have not been accessed for long periods of time (also called "cold data") are stored on cheaper (energy efficient) media such as tapes. However, accessing data from such media is also slower and this implies a substantial drop in performance of applications running on data stored in these media.

Machine learning mostly relies on artificial neural networks (ANNs), which are computational models inspired by biological neural networks in human or animal brains. Such systems progressively and autonomously learn tasks by means of examples; they have successfully been applied to, e.g., speech recognition, text processing and computer vision.

An ANN comprises a set of connected units or nodes, which compare to biological neurons in animal brains and are therefore called artificial neurons. Signals are transmitted along connections (also called edges) between artificial neurons, similarly to synapses. That is, an artificial neuron that receives a signal processes it and then signals connected neurons. In usual implementations, the signals conveyed along such connections are analog real numbers and outputs of the artificial neurons are computed thanks to a non-linear function of the sum of its inputs.

Connection weights (also called synaptic weights) are normally associated with the connections and nodes; such weights adjust as learning proceeds. Each neuron may have several inputs and a connection weight is attributed to each input (the weight of that specific connection). Such connection weights are learned by the training algorithm during a training phase and thereby updated. The learning process is iterative: data cases are presented to the network, typically one at a time, and the weights associated with the input values are adjusted at each time step.

Interestingly, a neural network may be implemented in hardware, e.g., by an optical neuromorphic system or a resistive processing unit. Neural networks may else be implemented in software. Many types of neural networks are known, starting with feedforward neural networks, such as multilayer perceptrons, deep neural networks and convolutional neural networks. Besides, new types of neural networks emerge, such as spiking neural networks.

A spiking neural network (SNN) substantially differs from usual neural networks, inasmuch as SNNs operate using spikes, which are discrete binary events that can occur asynchronously at any point in time, rather than analog values computed at regular time-steps. That is, in addition to neuronal and synaptic state, SNNs further incorporate the concept of time. I.e., neurons fire only when a membrane potential reaches a specific value, rather than firing at each propagation cycle as in, e.g., multi-layer perceptron networks. Firing means, in the context of SNNs, that a neuron generates a signal that reaches other neurons, which, in turn, increase or decrease their potentials according to the signals they receive from other neurons.

SUMMARY

According to a first aspect, a computer-implemented method for managing datasets of a storage system is provided. The datasets are assumed to be associated with respective sets of metadata. The method first relies on successively feeding first sets of metadata to a spiking neural network (SNN). The first sets of metadata fed correspond to datasets of the storage system that are already labeled with respect to classes they belong to. I.e., such datasets are thus associated with class labels. This makes it possible for the SNN to learn representations of said classes in terms of connection weights that weight the metadata fed. Next, during an inference phase, second sets of metadata are successively fed to the SNN (the second sets of metadata correspond to unlabeled datasets of the storage system), for the SNN to infer class labels for the unlabeled datasets, based on the second sets of metadata fed and the representations learned. Eventually, datasets of the storage system are managed based on their class labels, these including class labels as inferred during the inference phase.

According to another aspect, a storage system, which stores datasets is provided. The system notably comprises a platform, implementing a SNN, and a class determination unit. The latter is configured to successively feed first sets of metadata to the SNN, for it to learn representations of classes, as explained above. The class determination unit is further designed to successively feed second sets of metadata to the SNN, for it to infer class labels for unlabeled datasets, consistently with the above method. In addition, a management unit is provided, to manage datasets in the storage system, based on class labels of the datasets, including class labels inferred in operation of the system.

According to another aspect, a computer program product for managing datasets in a storage system is provided. The computer program product comprising a computer readable storage medium having program instructions embodied therewith, the program instructions being executable by a computerized system to cause to implement steps according to the above method.

Computerized systems, methods, and computer program products will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. Similar or functionally similar elements in the figures have been allocated the same numeral references, unless otherwise indicated.

DETAILED DESCRIPTION

Figure 1:
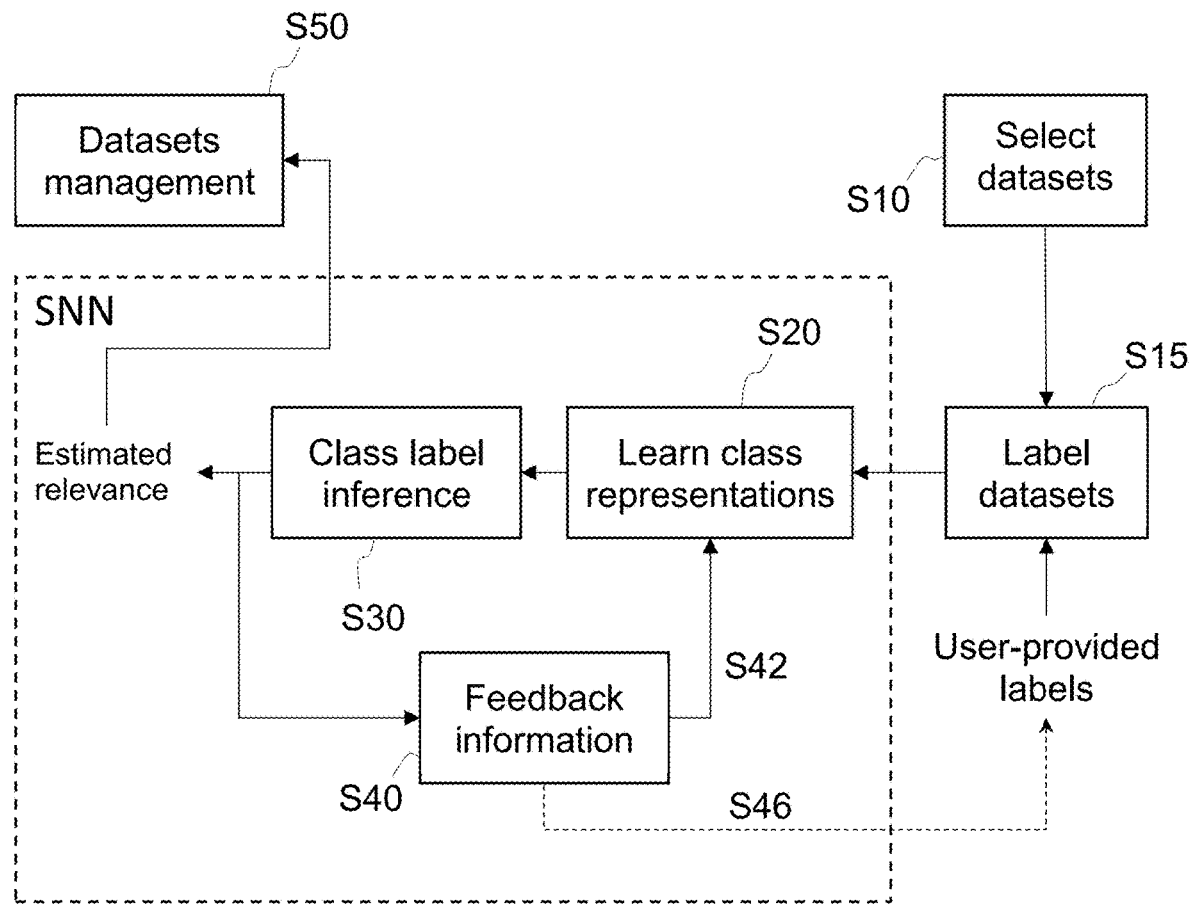
FIG. 1 is a block diagram schematically illustrating a high-level workflow of a method for managing datasets of a storage system, according to example embodiments.

The following description is structured as follows. First, general embodiments and high-level variants are described (sect. 1). The next section addresses more specific embodiments and technical implementation details (sect. 2).

1. General Embodiments and High-Level Variants

In reference to FIGS. 1-4, an aspect of the invention is first described, which concerns computer-implemented methods for managing datasets 5 (e.g., files) of a storage system 1.

The datasets 5 are associated with metadata, which may advantageously be captured as key-value pairs. That is, each dataset has a respective set of metadata. Some of the datasets need be labeled (typically a minority of the datasets) with respect to classes they belong to, to enable the learning S20 of class representations. Such datasets may for instance be selected S10 and labeled S15 by a user, during a pre-processing stage, to achieve a training set. Thus, labeled datasets are made available S15 at some point, which are associated with class labels, whereas remaining datasets (typically the vast majority) of the storage system 1 are not labeled yet.

Typically, the unlabeled datasets are initially not labeled with respect to any class of interest for the present methods. In variants, the remaining datasets may initially be insufficiently labeled, e.g., not labeled in the same extent that the afore-mentioned labeled S15 datasets are. In other variants, the remaining datasets may initially be inaccurately labeled. Thus, labels (or additional labels) need be inferred for the remaining datasets, in order to enable a management process as described herein.

The datasets considered here can be any consistent set of data, whose granularity may range between, e.g., data blocks (i.e., physical records, having a given, maximum length) and files (i.e., collections of blocks or file fragments), or collections of files. More generally, it may be any sequence of bytes or bits, or file fragments, having a predefined format or length.

A first phase S20 is dedicated to the learning of class labels. Namely, first sets of metadata are successively fed (see steps S22-S25 in FIG. 2) to a spiking neural network (SNN) 30, which metadata correspond to labeled datasets, for the SNN to learn S26-S27 representations of the corresponding classes, in terms of connection weights of the network. In operation, the connection weights are related to the metadata fed. I.e., such weights can be regarded as weighting the metadata of the first sets of metadata fed into the SNN, as per synaptic connections of the network.

Learning the representations of the classes amounts to refining values for the connection weights of the network. The learning process can for instance be thought of as causing to form representations of the classes as linear combinations of the connection weight values. In practice, however, the network may for example involve arrays of coefficients, which get refined along the learning process. Thus, a given class representation can be regarded as an array of weight values to the output neurons, which arises from sets of metadata fed into the network. The learned weight arrays can, in turn, be understood as compressed representations of groups of datasets (e.g., data files). Learning such representations amounts to learn similarities based on distances, in terms of metadata (e.g., metadata values) between the datasets and their respective classes.

During a second phase (inference) S30, second sets of metadata are successively fed S33-S36 to the SNN 30, which metadata now correspond to unlabeled datasets of the storage system. This is done so as for the SNN to infer S37-S38 class labels for the unlabeled datasets. Inferences performed by the SNN are based, on the one hand, on the second sets of metadata fed S33-S36 and, on the other hand, on the representations learned S26-S27 during the learning phase S20. That is, the inference phase causes to infer class labels for the unlabeled datasets, which may eventually be considered to belong to the classes inferred.

Again, the initially unlabeled datasets are datasets that are initially not rated (e.g., by users or applications) for the purpose of implementing the present methods, contrary to the labeled datasets, which can be regarded as forming a training set. Now, when running the above process S20, S30, the system 1 infer class labels for the initially unlabeled datasets. On completion of the inference process S30, the initially unlabeled datasets are associated with class labels and can thus be regarded as "labeled" by the system. Still, the datasets of the training set should be distinguished from the datasets as eventually labeled by the system, as the inferred labels are automatically and cognitively obtained, during the inference stage S30.

Eventually, the datasets 5 of the storage system 1 are managed S50, based on the class labels of the datasets, which include the inferred class labels in addition to class labels that have been used as inputs to the learning phase S20. Class labels can indeed advantageously be relied on to efficiently manage the datasets, e.g., to store, duplicate (reach a given level of redundancy), refresh, and/or garbage collect the datasets, etc. In particular, dataset management policies may be devised, which depend on the class labels of the datasets. E.g., data that are not accessed for long periods of time ("cold data") are stored on tapes.

The present approach leverages SNNs and their ability to process spatio-temporal data. Metadata corresponding to already labeled datasets are fed successively into the SNN, for it to learn representations of the classes, which amounts to efficiently learn similarities between the classes and the metadata fed. Note, this approach does not require to learn pairwise similarities between metadata fields and additionally learn a similarity metric for each labeled file to combine file-based similarity metrics with a similarity metric for each class. Rather, the SNN involves a single learning process, i.e., the learning of class representations. In addition, the class representations learned make it later possible to compute the similarity of an unlabeled dataset directly with one class representation, instead of with all labeled datasets, since a class is a compressed representation of these datasets. Thus, the present approach allows both significant computational storage space and computational time to be saved, compared to operations implied by multiple similarity metrics.

Furthermore, a SNN architecture can lead to significantly higher energy efficiency compared to non-spiking neural networks, thus allowing scalability to a very large number of input data objects.

Figure 2:
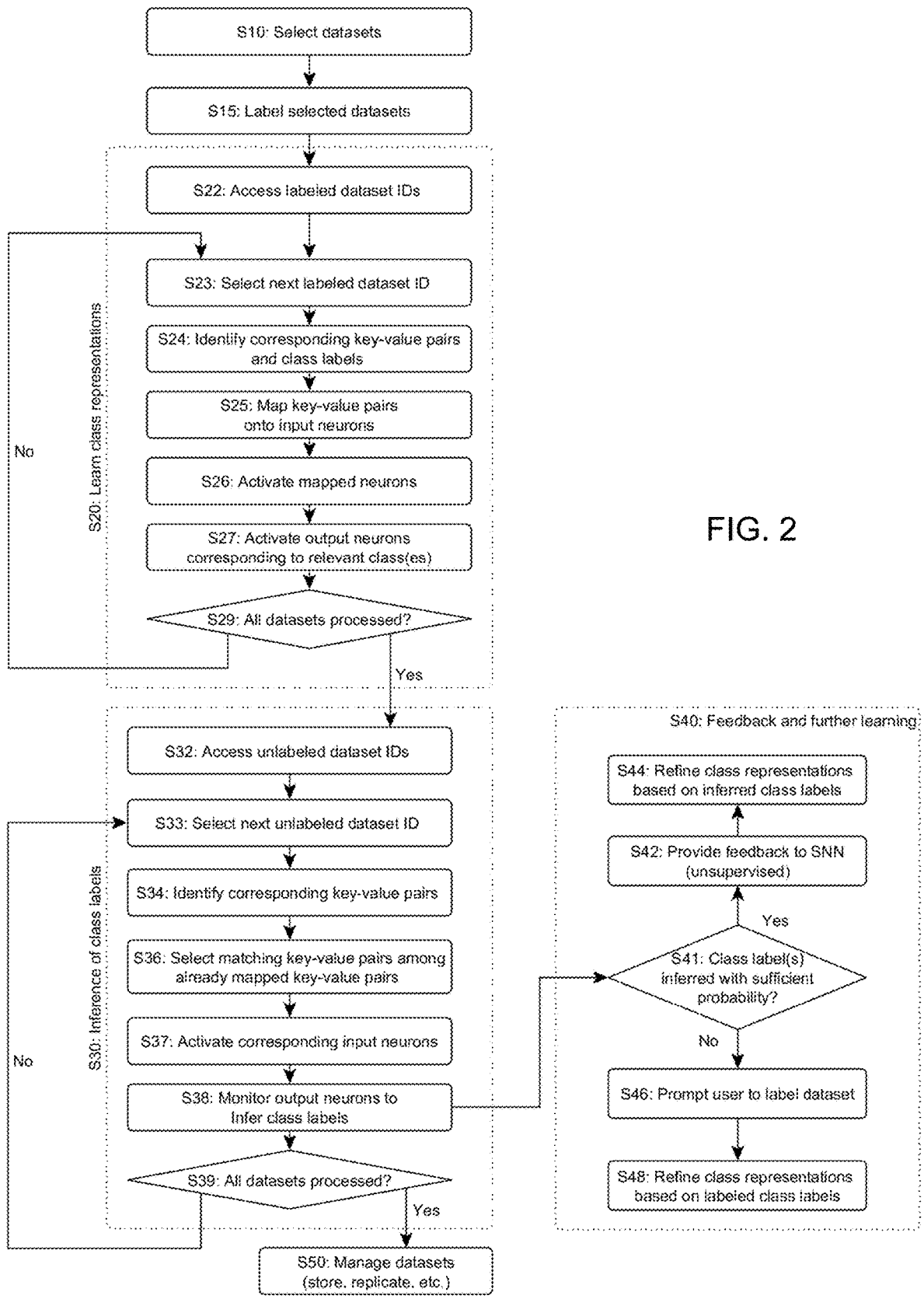
FIG. 2 is a flowchart illustrating detailed steps of such a method, as involved in example embodiments.
Figure 4:
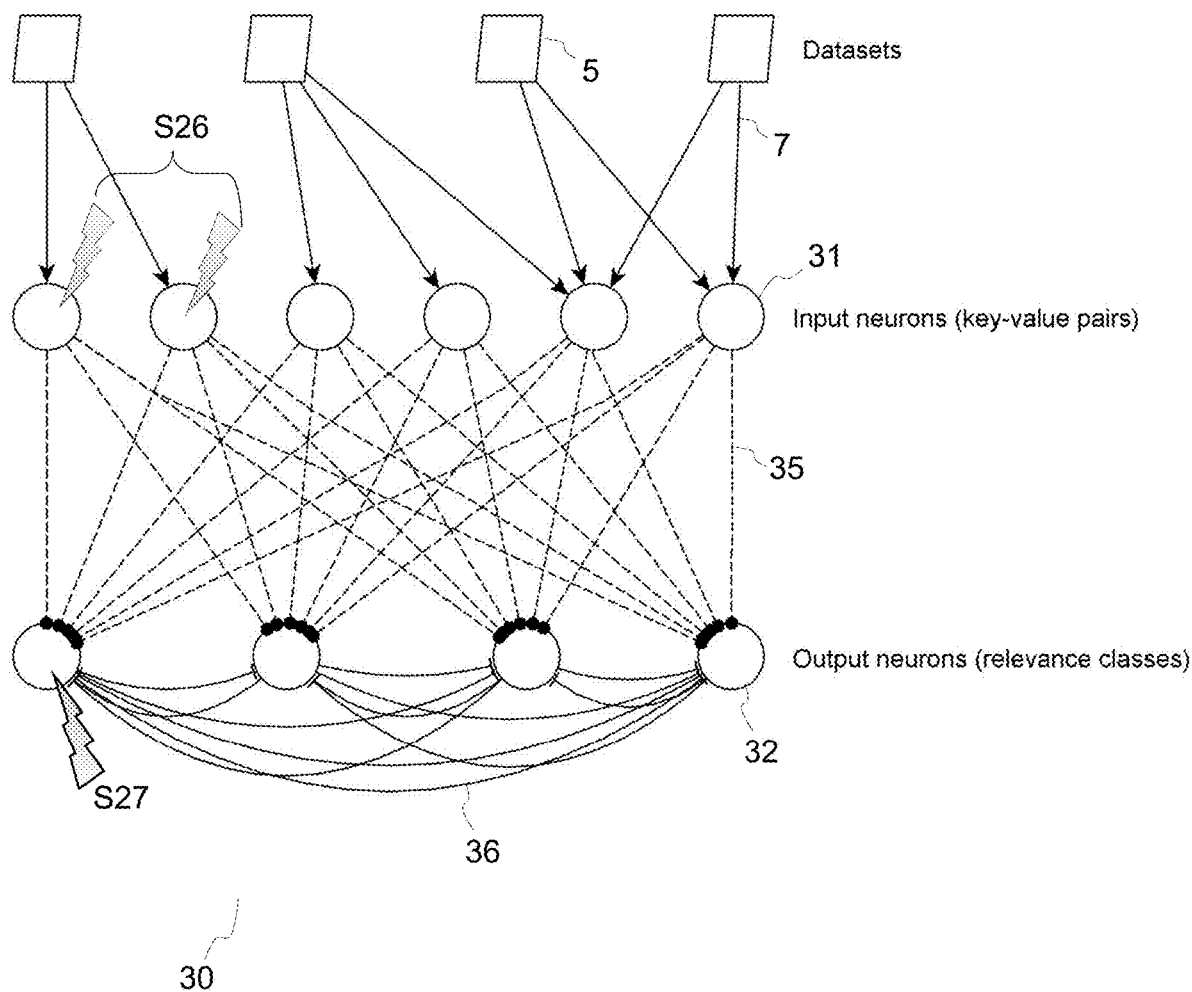
FIG. 4 schematically represents a preferred architecture of a spiking neural network, as involved in example embodiments described herein.

Referring now more specifically to FIGS. 2 and 4, feeding S23-S25 the first sets of metadata into the SNN 30 is preferably achieved by mapping S25 such metadata onto input neurons (input nodes) of the SNN 30. Then, the mapped input neurons need be activated S26, for the SNN 30 to learn S27 the class representations.

The sets of metadata may for instance be automatically mapped S23-S25 onto input nodes of the network, thanks to a systematic sorting algorithm, as datasets are successively accessed S22, S23, S29. For instance, a mere lookup table may be used to store a mapping from metadata to input neurons. Then, in operation, each dataset's metadata can be looked up in the table, and if such metadata are not yet included, additional entries mapping new metadata to additional input neurons can be added.

The mapping S25 achieved during the learning phase S20 can further be exploited during an inference phase S30. That is, second sets of metadata (corresponding to unlabeled datasets) may be successively fed S32-S36 into the SNN by identifying S36, among the mapped metadata, those metadata that match metadata pertaining to the second sets. The corresponding input neurons (i.e., the neurons corresponding to the matching metadata) can then be activated S37, in order to infer S37-S38 class labels for the unlabeled datasets, as illustrated in FIG. 2.

A very convenient way to achieve this is to rely on key-value pairs, as in preferred embodiments. That is, metadata of the datasets can be captured as key-value pairs, wherein each of the pairs comprises: a key representing a metadata field; and a value representing a value of that metadata field. E.g., the metadata of a given file f can be represented by a set of key-value pairs, i.e., $\{(k_1(f), v_{k1}(f)), (k_2(f), v_{k2}(f)), \ldots\}$, where $V_{ki}$ denotes the $i^{th}$ metadata value corresponding to the $i^{th}$ metadata field k of the $i^{th}$ pair.

In that respect, and as depicted in FIG. 4, key-value pairs of the first sets of metadata can easily be mapped S25 onto respective input neurons 31 of the SNN 30. In FIG. 4, the mappings from a dataset to input neuron are represented by arrows, such as arrow 7. That is, as per the mapping, each of the mapped input neurons corresponds to a respective one of the key-value pairs of the first sets of metadata.

This way, during the inference stage S30, it suffices to identify S36, among the already mapped S25 key-value pairs, those key-value pairs that match the key-value pairs of the second sets of metadata. In turn, the corresponding input neurons can be activated S37 to thereby infer S37-S38 class labels for the unlabeled datasets.

In variants, however, only the keys (corresponding to metadata fields) may be mapped onto input neurons, whereas metadata values can be encoded throughout the neuron activation. I.e., the metadata values impact the way input neurons are activated. Thus, the metadata mapped to individual neurons may either be keys only or key-value pairs.

Typically, a single class need be associated with each dataset and, thus, with the corresponding set of metadata, during the learning phase S20. However, in variants, one may want, upon learning class representations S20, to associate datasets with two or more classes. This can easily be achieved by simultaneously activating the corresponding output nodes.

Preferred SNN architectures are now described in more detail. In embodiments as depicted in FIG. 4, input neurons 31 belong to a first layer of the SNN 30, which further comprises a second layer of output neurons 32, which are mapped onto class labels. Note, however, that the mapping implicitly realized between datasets and corresponding metadata can also be regarded as a layer of the network 30. In FIG. 4, output neurons are connected to each other via all-to-all lateral inhibitory connections 36, while input neurons 31 are connected to output neurons 32 via all-to-all excitatory connections 35. In the example architecture of FIG. 4, the connection weights of the SNN are associated with respective excitatory connections 35. In variants, each output neuron may exert inhibition on the remaining output neurons by exciting an inhibitory interneuron that, in turn, inhibits the remaining output neurons.

Such an architecture makes it possible to easily learn S26-S27 the class representations and, this, for each labeled dataset corresponding to each set of key-value pairs as fed at steps S23-S25. Namely, each time a new set of key-value pairs are mapped S25 onto respective input nodes 31, class representations can be learned (or rather updated), in terms of connection weights values, by activating S26 both the mapped neurons 31 and the relevant output neuron(s) 32, i.e., the output neuron(s) 32 corresponding to the class label associated with this new set of key-value pairs, since this class label is assumed to be known at learning S20. That is, on the one hand, the mapped neurons are activated S26, whereby spike trains are generated from the activated neurons 31. On the other hand, relevant output neuron(s) can be concurrently activated S27 (e.g., stimulated) with a teacher signal, so as to increase a spiking frequency of this output neuron and lower spiking frequencies of other neurons of the second layer.

The weights may for instance be updated using a Hebbian learning rule, which strengthens a synaptic weight where the synapse's pre- and post-synaptic neural activities are correlated, and weakens this weight where such activities are instead uncorrelated or anticorrelated. A so-called spike-timing-dependent plasticity (STDP) is an example of such a learning rule, whereby the order and the timing interval defined by pairs of pre- and post-synaptic spikes dictate the direction and amplitude of a weight update. Still, other Hebbian rules, or variants to Hebb's rule can be contemplated, such as the rate-based Hebbian learning, anti-Hebbian learning, or the Bienenstock-Cooper-Munro (BCM) rule. Alternatively, non-Hebbian, supervised spike-based learning rules can potentially be relied on, like the so-called spiking back-propagation, normalized approximate descent ("NormAD"), SpikeProp or ReSuMe may possibly be used.

The SNN 30 is preferably configured as a winner-take-all network. Depending on the weight of the inhibitory connections, it can be a hard winner-take-all (whereby datasets inferred belong to a single class), or a soft winner-take-all (multiple classes are inferred with different confidences/probabilities).

For example, in embodiments, files from a training set may be accessed S22, one after the other S23, S29, for learning purposes S20. There, for each file, input neurons 31 onto which the corresponding S24 key-value pairs are mapped S25 are activated S26, which generates Poisson spike trains. The output neuron that corresponds to the known class for this file is concurrently stimulated S27 with a teacher signal, so as for it to "spike" more than other output neurons. Such a learning is active, i.e., synapses from active key-value pairs to the class dictated by the label get potentiated, while synapses from these key-value pairs to other classes get depressed. By so doing, output neurons start forming representations of the relevance classes, which can be viewed as linear combinations of the key-value pairs (due to the synaptic weights), with contributions from all past training files, due to the incremental training S22, S23, S29. The process repeats S23, S29 as necessary for each file selected S10-S22.

Now, on inference S30 (where no relevant class label is available), metadata of each unlabeled file considered S32 are selected S33, S39 for one file at a time, as reflected in FIG. 2, for the purpose of inferring S30 class labels. There, key-value pairs corresponding to already mapped S25 metadata can be identified S34, whereby matching pairs are selected S36 to activate S37 the corresponding input neurons. Input spikes from the activated S37 neurons 31 stimulate output neurons 32, which are monitored S38. One of the output neurons will typically be more active than the others due to the input file's similarity with the corresponding class, as learned during earlier training S20. Depending on the network's configuration, the most active output neuron may suppress or, at least, inhibit other output neurons, due to the lateral inhibitory connections 36. Again, depending on the weight of the inhibitory connections 36, the network can be a hard winner-take-all (the file inferred to belong to a single class), or a soft winner-take-all (multiple classes are inferred with different confidences/probabilities).

In all cases, the output signals can be converted into information as to inferred labels, which is then used to accordingly manage S50 files stored on the system 1. In practice, learning phases S20 and inference phases S30 can be intermingled, so as to dynamically manage datasets (including newly stored datasets) of the storage system.

Referring back to FIGS. 1 and 2, embodiments are now discussed, which involve various kinds of feedback. A first possibility is to provide S42 feedback information as to the inferred class labels to the SNN (in an unsupervised manner) for it to accordingly refine S44 representations of the classes. As seen in FIG. 1, this type of feedback can be provided right after an inference, i.e., whereby a new class label is inferred for a new input dataset 5. That is, based on a class label as newly inferred for a given set of metadata, connection weight values can be altogether refined S44 to improve the class representations.

Preferably though, such feedback information is provided S42 only in respect of unlabeled datasets for which class labels were inferred S38 with probabilities exceeding a given threshold S41. I.e., if it can conclusively be determined that an initially unlabeled dataset belongs to a given class, as per a corresponding inference, then that dataset can effectively be considered as a duly labeled dataset, just like datasets as initially labeled S15. This, in turn, can be used to refine the learning of representations of the classes.

Additional feedback can further be obtained, this time in a supervised way. That is, in embodiments, class labels inferred for some of the initially unlabeled datasets may be used as a basis to prompt S46 a user to label of such datasets. This too makes it possible for the SNN to refine S48 representations of the classes, though in a supervised manner.

Whether to prompt S46 the user to label such datasets may possibly be based on the confidence with which a class label is inferred. That is, the user may be prompted S46 only in respect of unlabeled datasets for which class labels were inferred with probabilities S41 that do not exceed a given threshold. Note, the threshold used here can (but does not necessarily need to be) the same as the threshold used to decide whether to provide unsupervised feedback information. For example, a lower threshold may be imposed, under which labels may systematically be requested S46 to refine S48 the learning, while an upper threshold may be used for unsupervised feedback S42, S44. Datasets that fall between these two thresholds may for instance be temporarily labeled and later re-injected into the SNN to refine the inferred class labels, if necessary. More sophisticated scenarios may be contemplated, which involve additional thresholds.

In all cases, by refining the class estimation using feedback, the estimation accuracy can be improved over time and changes in the classes can be tracked.

In embodiments, the classes learned and inferred are relevance-based classes. That is, the inferred class labels are, each, indicative of a relevance of the corresponding datasets 5 (as perceived for one or more users of the datasets). In turn, the datasets can be managed in the storage system 1 according to their perceived relevance.

At present, the management of the datasets across the storage system 1 is explained in more detail. Beyond the mere dataset storage, active management S50 may notably address the relocation of the datasets 5, their redundancy and garbage collection. E.g., the class labels obtained may impact the (re-)location of the datasets across storage tiers 11-13 of the storage system 1. In particular, a policy of the tiered storage system 1 may be devised, which may assign the most relevant data to high-performance storage tiers, store the most relevant data with higher redundancy, whereas less relevant data can be stored on low-performance (cheaper, and/or slower) storage tiers, and/or store less relevant data with lower redundancy, amongst other examples.

The datasets as initially labeled S15 by the user(s) may, in practice, represent less than 5% of the total number of datasets stored on the storage system 1. Still, this percentage may vary, depending on the capacity and utilization of the storage system. E.g., it may be less than 1%, or even 0.1%, if the total number of datasets in on the order of a billion or more, or reach 10% or more when only a few thousands of datasets are stored.

The present schemes all rely on initially labeled S15 datasets, i.e., a training set, which may be obtained thanks to inputs S2 of a user (or users), or, even, applications 2. Embodiments of the present methods may accordingly include (prior to a first learning phase S20) steps S15 aiming at rating datasets selected S10 for the training. For example, as assumed in FIG. 3, user ratings may be received at step S2 by the storage units 1 and then passed to the class determination unit 20, based on which the class representations may subsequently be computed S20. As said above, only a small fraction of the datasets is typically needed to train the system.

Figure 3:
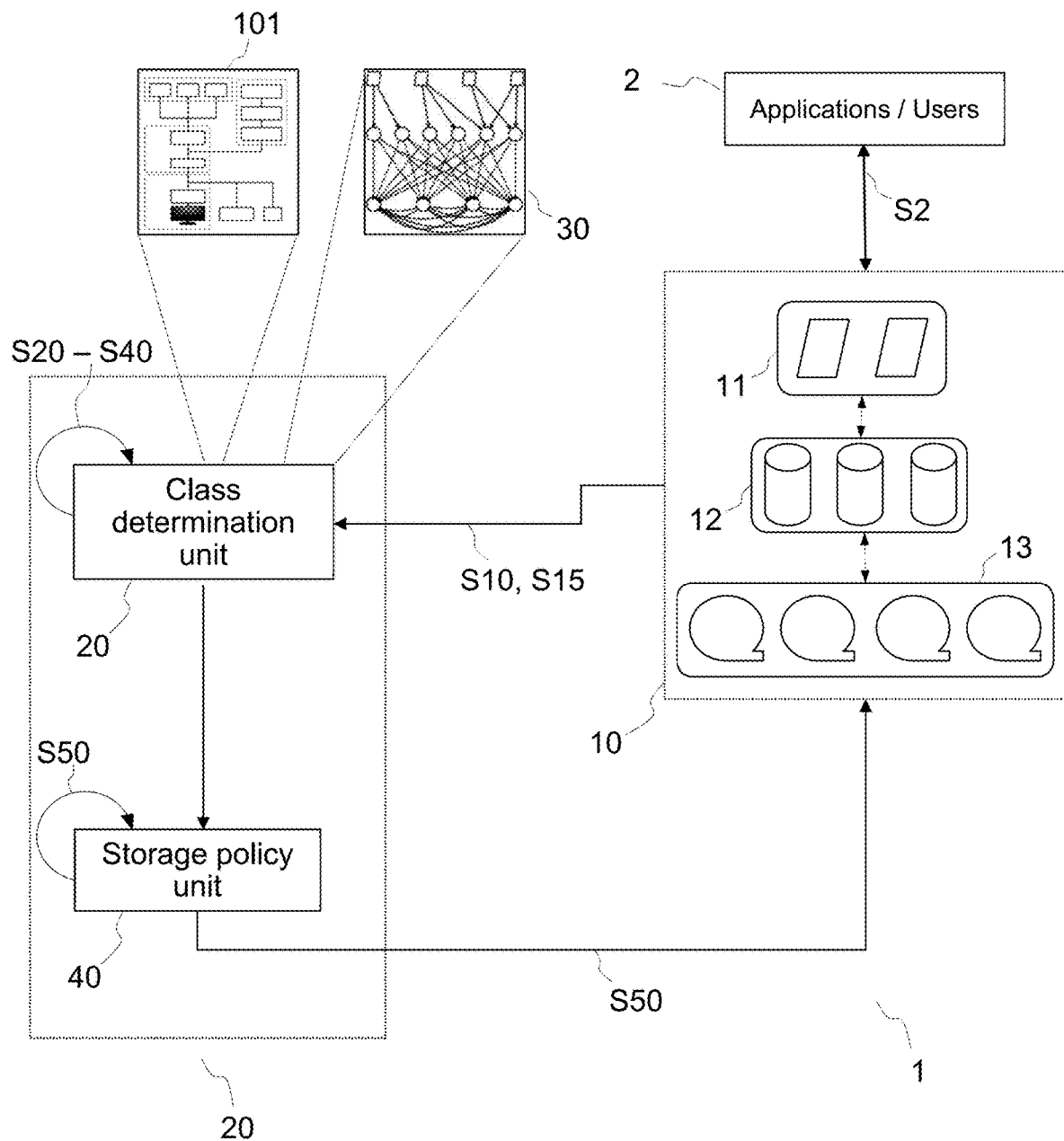
FIG. 3 is a block diagram schematically illustrating selected components of a storage system according to example embodiments.

As further seen in FIGS. 2 and 3, once class labels have been obtained S20-S40, e.g., for files as selected at steps S10 as per exchanges with the applications/users or the storage units 10, a suitable management policy may be invoked by unit 40, which takes the determined class labels as input. As a result, this management policy may notably instruct S50 to store, duplicate, garbage collect, etc., the datasets 5 across storage tiers 11-13 of the storage system 1, based on their associated labels. This includes the initial datasets (those of the training set, which have been initially rated) and, all the more, the initially unlabeled datasets, for which class labels were automatically determined S30-S40. Statistics as to the distribution of class labels (e.g., relevance values) may further be aggregated and maintained, in order to design suitable storage policies for the storage system 1. In addition, the management policy may be context-dependent.

Referring again to FIG. 3, another aspect is now described, which concerns the storage system 1 as such.

Basically, the system 1 comprises a platform, which implements the SNN 30, e.g., as a winner-take-all network. For performance reasons, this SNN shall preferably be implemented in hardware, e.g., by an optical neuromorphic system or by a resistive processing unit. In variants, however, the SNN 30 can be implemented in software. In all cases, the SNN 30 shall preferably have an architecture such as depicted in FIG. 4. I.e., it may comprise a first layer of input neurons 31, onto which key-value pairs are mapped, and a second layer of output neurons 32 mapped onto class labels. Again, output neurons can be connected to each other via all-to-all lateral inhibitory connections 36, while input neurons 31 connect to the second layer 32 via all-to-all excitatory connections 35.

In addition, the system 1 comprises a class determination unit 20, which is configured to feed S22-S25, S32-S36 sets of metadata to the SNN 30, be it to learn S26-S27 representations of the classes or infer S37-S38 class labels for unlabeled datasets, as explained earlier. The unit 20 need thus be suitably connected to the platform implementing the SNN. In addition, the unit 20 is operatively connected to a management unit 40, for it to manage S50 datasets 5 in the storage system 1, based on class labels determined S38 (or otherwise obtained S15) for the datasets, as discussed earlier in reference to the first aspect of this invention.

As illustrated in FIG. 3, the system 1 is preferably a tiered storage system. In such cases, the management unit 40 may further be configured to relocate the datasets 5 across storage tiers 11-13 of the storage system 1, based on class labels obtained, in operation of the system 1. More generally, sophisticated policies may be devised, which exploit class labels as inferred according to the present methods, to suitably manage datasets across the storage tiers, as noted earlier.

In the example of FIG. 3, the storage units 10 comprise three tiers 11-13 of storage. More generally though, the system may comprise two tiers, or more than three tiers of storage. A tiered storage system is known per se. A tier is typically defined as a homogenous collection of storage devices of a same kind, having all similar (if not identical) storage characteristics. The units 10 depicted in FIG. 3 involve SSD devices 11 (first tier), high-end disks 12 (second tier), and tape drives 13 (third tier). Yet, additional tiers could be involved, e.g., low-end disks could be used in an intermediate tier between tiers 12 and 13.

Although the datasets considered herein can be any consistent set of data, these are preferably files or collections of files, which can easily be rated to form training sets. This way, labels for remaining files or set of files of the systems can easily be inferred.

The datasets stored across the tiers are likely to be accessed by one or more applications 2 as the latter interact S2 with the storage units 10. By interacting with the units 10, applications 2 consume data as input, which input data need be fetched from the storage units 10, and also produce new data, which may need be stored on the units 10. Thus, new datasets may constantly appear, which may need be labeled S30-S40 according to the present methods, whence the advantage of the learning and inference techniques proposed.

Figure 5:
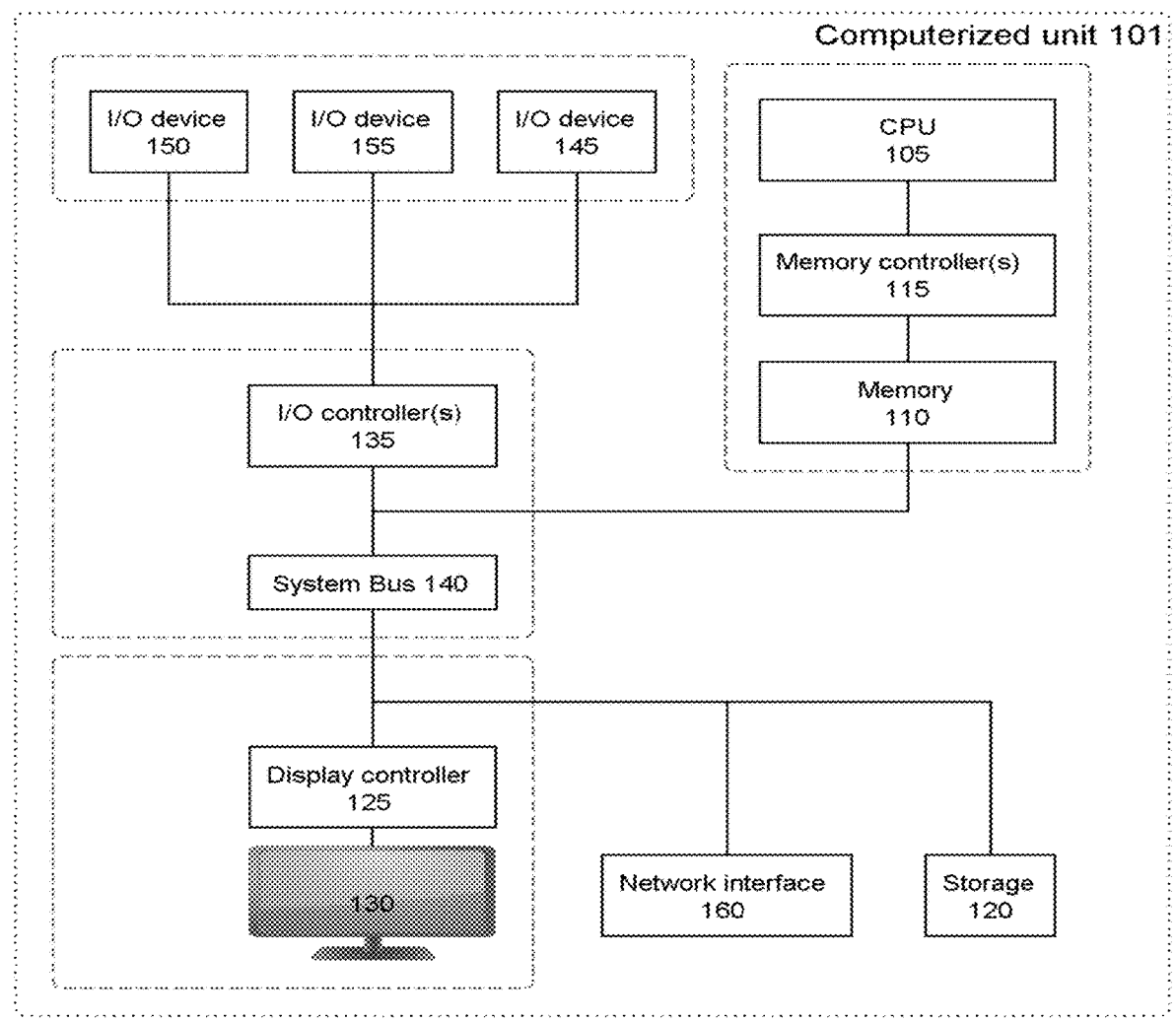
FIG. 5 schematically represents a general purpose computerized unit, suited for implementing one or more steps of a method such as illustrated in FIG. 1 or 2, as in embodiments.

Next, according to another aspect a computer program product may be provided. The latter will typically be a computer readable storage medium having program instructions embodied therewith, which instructions are executable by one or more processors, e.g., of a computerized unit 101 such as depicted in FIG. 5, to implement functions of units 10, 20 and/or 40, as described above. Further details are given in sect. 2.2.

The above embodiments have been succinctly described in reference to the accompanying drawings and may accommodate a number of variants. Several combinations of the above features may be contemplated. Examples are given in the next section.

2. Specific Embodiments and Technical Implementation Details

2. Technical Implementation Details 2.1 Computerized Units

Computerized devices can be suitably designed for implementing example embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, example embodiments of the present invention can be implemented wherein general-purpose digital computers, such as personal computers, workstations, etc., are used.

For instance, the system 1 and/or the units 10, 20, 40 depicted in FIG. 3 may, each, involve one or more computerized units 101, such as schematically depicted in FIG. 5, e.g., general-purpose computers. In exemplary embodiments, in terms of hardware architecture, as shown in FIG. 5, the unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications and, this, notably with the platform implementing the SNN 30. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105. The various components in FIG. 5 may be interconnected by one or more buses, such as system bus 140 (such as address, data, or control buses for example).

The software in memory 110 may include one or more separate programs, each of which comprises an ordered listing of executable instructions for implementing logical functions. In the example of FIG. 5, the software in the memory 110 includes methods described herein in accordance with exemplary embodiments and a suitable operating system (OS). The OS essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145-155 may include other hardware devices. In addition, the I/O devices 145-155 may further include devices that communicate both inputs and outputs. The system 10 can further include a display controller 125 coupled to a display 130. In exemplary embodiments, the system 10 can further include a network interface or transceiver 160 for coupling to a network (not shown) and thereby interact with other units, making up a system such as depicted in FIG. 3.

The network transmits and receives data between the unit 101 and external systems. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In exemplary embodiments, network can be a managed IP network administered by a service provider. Besides, the network can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS, in whole or in part are read by the processor 105, typically buffered within the processor 105, and then executed. When the methods described herein are implemented in software, the methods can be stored on any computer readable medium, such as storage 120, for use by or in connection with any computer related system or method.

2.2 Computer Program Products

A system, a method, and/or a computer program product may be provided in accordance with example embodiments described herein. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A computer-implemented method for managing datasets of a storage system, wherein the datasets have respective sets of metadata, the method comprising:
successively feeding first sets of metadata to a spiking neural network (SNN), the first sets of metadata fed corresponding to datasets of the storage system that are labeled with respect to classes they belong to, so as to be associated with class labels, for the SNN to learn representations of said classes in terms of connection weights that weight the metadata fed, wherein the first sets of metadata comprise a set of key-value pairs as training data used to learn the representations of the classes;
successively feeding second sets of metadata to the SNN, the second sets of metadata corresponding to unlabeled datasets of the storage system, for the SNN to infer class labels for the unlabeled datasets, based on the second sets of metadata fed and the representations learned, wherein the second sets of metadata comprise a set of key-value pairs used to infer the class labels of the unlabeled datasets; and
managing datasets in the storage system, based on class labels of the datasets, these including the inferred class labels;
wherein the classes are relevance-based classes, wherein the inferred class labels are, each, relevance-based class labels and are, each, indicative of a relevance of the corresponding datasets for one or more users of the datasets, and the corresponding datasets are managed in the storage system according to their relevance and the relevance-based class labels.

2. The method according to claim 1, wherein successively feeding said first sets of metadata comprises mapping the at least first set of key-value pairs of the training data onto input neurons of said SNN and activating the mapped input neurons to thereby learn said representations.

3. The method according to claim 2, wherein successively feeding said second sets of metadata comprises identifying, among the mapped set of key-value pairs of the training data corresponding to the datasets that are labeled prior to the inferring, those key-value pairs mapped onto the input neurons that match the key-value pairs of the second sets of metadata, and activating corresponding input neurons onto which the key-value pairs of the first sets of metadata that match key-value pairs of the second sets of metadata are mapped to thereby infer said class labels for the unlabeled datasets.

4. The method according to claim 3, wherein the key-value pairs comprise a key representing a metadata field and a value representing a value of that metadata field.

5. The method according to claim 4, wherein:
mapping metadata of said first sets comprises mapping the key-value pairs of said first sets onto respective input neurons of said SNN, whereby each of the mapped input neurons corresponds to a respective one of the key-value pairs of said first sets; and
identifying those metadata that match metadata of the second sets comprises identifying, among the mapped key-value pairs, those key-value pairs that match the key-value pairs of the second sets, so as to activate corresponding input neurons and thereby infer class labels for the unlabeled datasets.

6. The method according to claim 4, wherein said input neurons belong to a first layer of the SNN, which further comprises a second layer of output neurons mapped onto said class labels, wherein:
the output neurons are connected to each other via all-to-all lateral inhibitory connections to which said connection weights are associated, so that each neuron of the second layer is connected to all the other neurons of the second layer, and
input neurons of the first layer are connected to output neurons of the second layer via all-to-all excitatory connections to which said connection weights are associated, so that each neuron of the first layer is connected to each neuron of the second layer.

7. The method according to claim 6, wherein said representations are learned, for each labeled dataset corresponding to each set of key-value pairs fed, by at least one of:
activating the mapped neurons of the first layer, to generate spike trains from the activated neurons; or
activating, with a teacher signal, a given neuron of the second layer that is mapped onto a class label for said each labeled dataset, so as to increase a spiking frequency of said given neuron and lower spiking frequencies of other neurons of the second layer.

8. The method according to claim 1, further comprising:
providing feedback information using information from the inference of the class labels, unsupervised without the known class labels, to the SNN for the feedback to refine the learning of representations of said classes.

9. The method according to claim 8, wherein said feedback information is provided only in respect of unlabeled datasets for which class labels were inferred with probabilities of belonging to the classes exceeding a given threshold.

10. The method according to claim 9, further comprising:
prompting, based on class labels inferred for one or more of the unlabeled datasets, a user to label said one or more unlabeled datasets, for the SNN to refine the learning of the representations of said classes.

11. The method according to claim 10, wherein the user is prompted to label said one or more unlabeled datasets only in respect of unlabeled datasets for which class labels were inferred with probabilities of belonging to the classes that do not exceed a given threshold.

12. The method according to claim 6, wherein the SNN is configured as a winner-take-all network.

13. The method according to claim 1, wherein managing the datasets comprises:
relocating some of the datasets across storage tiers of the storage system, based on class labels of the datasets, these including the inferred class labels.

14. The method according to claim 1, wherein a number of the labeled datasets is, prior to successively feeding first sets of metadata to the SNN, less than 5% of a number of datasets stored on the storage system.

15. The method according to claim 1, wherein the SNN is configured as a soft winner-take-all so that multiple classes are inferred with different confidences or probabilities.

16. A computing system for managing datasets in a storage system, the computing system comprising:
one or more memories comprising computer-readable code; and
one or more processors, which in response to execution of the computer readable code cause the computing system to perform the following:
successively feed first sets of metadata to a spiking neural network (SNN), the first sets of metadata fed corresponding to datasets of the storage system that are labeled with respect to classes they belong to, so as to be associated with class labels, for the SNN to learn representations of said classes in terms of connection weights that weight the metadata fed, wherein the first sets of metadata comprise a set of key-value pairs as training data used to learn the representations of the classes;
wherein successively feeding said first sets of metadata comprises mapping the set of key-value pairs of the training data onto input neurons of said SNN and activating the mapped input neurons to thereby learn said representations;
successively feed second sets of metadata to the SNN, the second sets of metadata corresponding to unlabeled datasets of the storage system, for the SNN to infer class labels for the unlabeled datasets, based on the second sets of metadata fed and the representations learned, wherein the second sets of metadata comprise a set of key-value pairs used to infer the class labels of the unlabeled datasets;
wherein successively feeding said second sets of metadata comprises identifying, among the mapped set of key-value pairs of the training data corresponding to the datasets that are labeled prior to the inferring, those key-value pairs mapped onto the input neurons that match the key-value pairs of the second sets of metadata, and activating corresponding input neurons onto which the key-value pairs of the first sets of metadata that match key-value pairs of the second sets of metadata are mapped to thereby infer said class labels for the unlabeled datasets; and manage datasets in the storage system, based on class labels of the datasets, these including the inferred class labels, in operation of the storage system.

17. The computing system according to claim 16, wherein the computing system is further caused to:

relocate the datasets across storage tiers of the storage system, based on the inferred class labels, in operation.

18. The computing system according to claim 16, wherein the SNN comprises a first layer of input neurons, onto which key-value pairs are mapped and a second layer of output neurons mapped onto said class labels, the output neurons connected to each other via all-to-all lateral inhibitory connections to which said connection weights are associated, so that each neuron of the second layer is connected to all the other neurons of the second layer, the first layer of neurons connected to the second layer of output neurons via all-to-all excitatory connections to which said connection weights are associated, so that each neuron of the first layer is connected to each neuron of the second layer, to which said connection weights are associated.

19. The storage system according to claim 16, wherein the SNN is implemented as a winner-take-all network.

20. A computer program product for managing datasets in a storage system, the computer program product comprising a computer readable storage medium having program instructions embodied therewith, the program instructions being executable by a computerized system to cause to:

successively feed first sets of metadata to a spiking neural network (SNN), the first sets of metadata fed corresponding to datasets of the storage system that are labeled with respect to classes they belong to, so as to be associated with class labels, for the SNN to learn representations of said classes in terms of connection weights that weight the metadata fed, wherein the first sets of metadata comprise a set of key-value pairs as training data used to learn the representations of the classes;

successively feed second sets of metadata to the SNN, the second sets of metadata corresponding to unlabeled datasets of the storage system, for the SNN to infer class labels for the unlabeled datasets, based on the second sets of metadata fed and the representations learned, wherein the second sets of metadata comprise a set of key-value pairs used to infer the class labels of the unlabeled datasets;

provide feedback information using information from the inference of the class labels, unsupervised without the known class labels, to the SNN for the feedback to refine the learning of representations of said classes; and manage datasets in the storage system, based on class labels of the datasets, these including the inferred class labels.

* * * * *